(12) United States Patent
Park

(10) Patent No.: US 10,424,817 B2
(45) Date of Patent: Sep. 24, 2019

(54) POUCH TYPE RECHARGEABLE BATTERY

(71) Applicant: Samsung SDI Co., Ltd., Yongin-si, Gyeonggi-do (KR)

(72) Inventor: Yong-Kyun Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 159 days.

(21) Appl. No.: 15/299,017

(22) Filed: Oct. 20, 2016

(65) Prior Publication Data

US 2017/0125851 A1 May 4, 2017

(30) Foreign Application Priority Data

Oct. 28, 2015 (KR) .......................... 10-2015-0150480

(51) Int. Cl.
| | |
|---|---|
| *H01M 10/058* | (2010.01) |
| *H01M 10/0587* | (2010.01) |
| *H01M 2/02* | (2006.01) |
| *H01M 10/04* | (2006.01) |
| *H01M 10/0525* | (2010.01) |

(52) U.S. Cl.
CPC ....... *H01M 10/0587* (2013.01); *H01M 2/021* (2013.01); *H01M 2/026* (2013.01); *H01M 2/0212* (2013.01); *H01M 2/0217* (2013.01); *H01M 2/0267* (2013.01); *H01M 2/0275* (2013.01); *H01M 2/0277* (2013.01); *H01M 2/0287* (2013.01); *H01M 2/0292* (2013.01); *H01M 10/0431* (2013.01); *H01M 10/0436* (2013.01); *H01M 10/0468* (2013.01); *H01M 10/0525* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 6,083,640 A | 7/2000 | Lee et al. | |
| 2002/0127362 A1* | 9/2002 | Jansen | B32B 3/02 428/40.1 |
| 2005/0153210 A1* | 7/2005 | Kameyama | H01M 2/0212 429/324 |
| 2011/0064991 A1 | 3/2011 | Ahn | |

(Continued)

FOREIGN PATENT DOCUMENTS

| | | |
|---|---|---|
| KR | 10-0280720 B1 | 6/2000 |
| KR | 10-0303541 B1 | 7/2000 |

(Continued)

*Primary Examiner* — Yoshitoshi Takeuchi
(74) *Attorney, Agent, or Firm* — Knobbe, Martens, Olson & Bear, LLP

(57) ABSTRACT

A pouch type rechargeable battery according to an exemplary embodiment includes: an electrode assembly that includes a first electrode, a separator, and a second electrode; a fixing member that includes a first fixing member and a second fixing member positioned at opposite sides of the electrode assembly; and a pouch that is provided with an accommodation part for accommodating the electrode assembly and a sealing part that surrounds the accommodation part and is thermo-bonded, wherein the fixing member may have a first part overlapping the electrode assembly, a second part overlapping the sealing part, and a width of the second part is narrower than the sealing part.

10 Claims, 7 Drawing Sheets

(56) References Cited

U.S. PATENT DOCUMENTS

2011/0151307 A1    6/2011  Hwang et al.
2015/0140396 A1*   5/2015  Yamazaki ........... H01M 2/0212
                                                            429/127
2015/0318518 A1    11/2015 Kim

FOREIGN PATENT DOCUMENTS

| KR | 10-1182901 B1 | 3/2011 |
| KR | 10-1223631 B1 | 6/2011 |
| KR | 10-2014-0133218 A | 11/2014 |

* cited by examiner

POUCH TYPE RECHARGEABLE BATTERY

RELATED APPLICATIONS

This application claims priority to and the benefit of Korean Patent Application No. 10-2015-0150480 filed in the Korean Intellectual Property Office on Oct. 28, 2015, the entire contents of which are incorporated herein by reference.

BACKGROUND

Field

The described technology relates generally to a rechargeable battery, and more particularly, to a pouch type rechargeable battery.

Description of the Related Art

With advancement of technologies for mobile devices, the demand for rechargeable batteries as an energy source has been increasing. A rechargeable battery differs from a primary battery in that it can be repeatedly charged and discharged, while the latter is incapable of being recharged.

Energy density is a critical issue when manufacturing rechargeable batteries. Particularly, rechargeable batteries used in small electronics are inserted in an electronic device and are used as a power supply.

A rechargeable battery includes an electrode assembly that consists of a positive electrode plate, a separator, and a negative electrode plate and a case which accommodates the electrode assembly. The electrode assembly is sorted into a spirally-wound type and a stacked type. A plurality of thin films are stacked in both the spirally-wound type of and the stacked type electrode assemblies.

The spirally-wound type of the electrode assembly, which is wound based on a spirally-wound axis thereof after a thin plate is stacked, should maintain a predetermined certain form even after being spirally-wound.

However, when an external impact is applied to the rechargeable battery, a shape of the electrode assembly may be deformed, and when the electrode assembly does not maintain its own initial shape, performance of the rechargeable battery may deteriorate.

The above information disclosed in this Background section is only to enhance the understanding of the background of the described technology and therefore it may contain information that does not form the prior art that is already known in this country to a person of ordinary skill in the art.

SUMMARY OF CERTAIN INVENTIVE ASPECTS

An exemplary embodiment provides a pouch type rechargeable battery, including: an electrode assembly that includes a first electrode, a separator, and a second electrode; a fixing member that includes a first fixing member and a second fixing member positioned at opposite sides of the electrode assembly; and a pouch that is provided with an accommodation part for accommodating the electrode assembly and a sealing part that surrounds the accommodation part and is thermo-bonded, wherein the fixing member may have a first part overlapping the electrode assembly, a second part overlapping the sealing part, and a width of the second part is narrower than the sealing part.

The second part of the first fixing member and the second part of the second fixing member may be thermo-bonded to each other.

The first part of the first fixing member and the first part of the second fixing member may respectively contact one surface or the other surface of the electrode assembly.

The fixing member may include at least one of polyethylene terephthalate (PET), poly imide (PI), and oriented polypropylene (OPP).

The electrode assembly may be a jelly roll shape that is spirally-wounded based on a winding axis.

The second part of the fixing member may be extendedly formed in a parallel direction to the winding axis.

By forming the fixing member according to the exemplary embodiment, it is possible to stably maintain the electrode assembly in the jelly roll. In addition, by overlapping and thermo-bonding the second part of the fixing member and the edge of the pouch, it is possible to double-sealing the rechargeable battery in the pouch.

DETAILED DESCRIPTION OF CERTAIN INVENTIVE EMBODIMENTS

Figure 1:
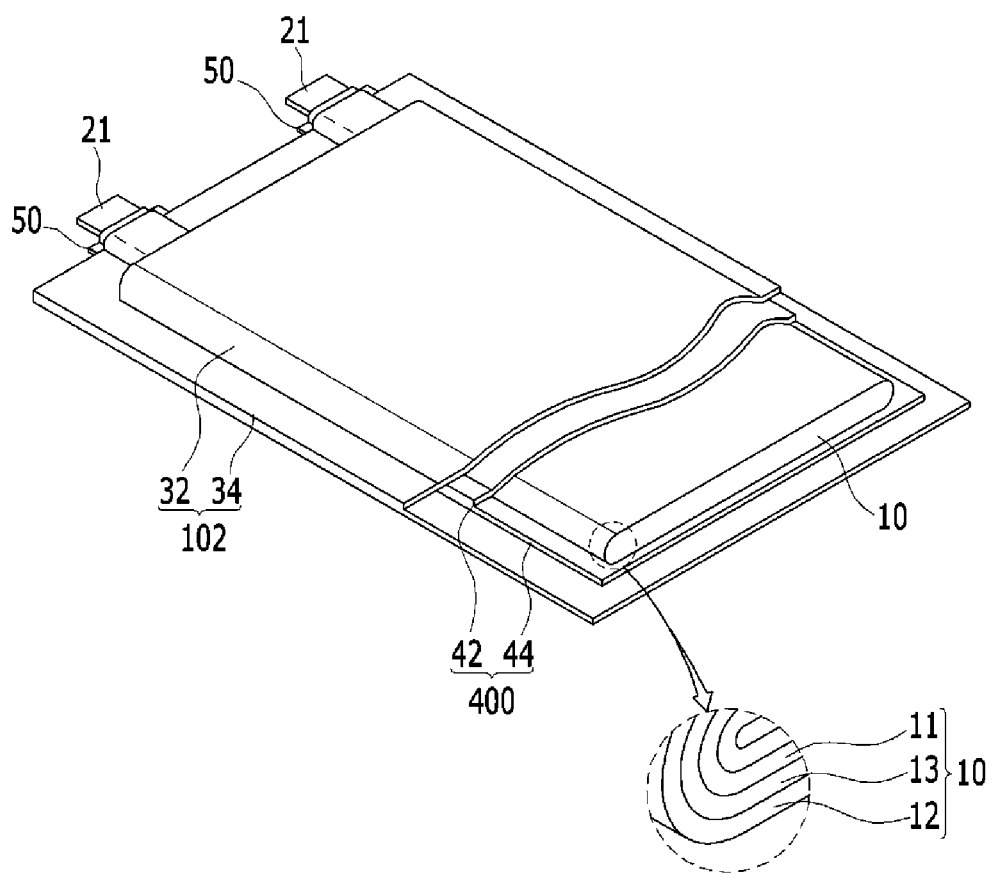
FIG. 1 illustrates a perspective view of a rechargeable battery according to an exemplary embodiment.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification Further, in the drawings, the size and thickness of each element are arbitrarily illustrated for ease of description, and the present invention is not necessarily limited to those illustrated in the drawings.

In the drawings, the thickness of layers, films, panels, regions, etc., are exaggerated for clarity. In the drawings, for ease of description, the thicknesses of some layers and regions are exaggerated. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. Further, in the specification, the word "on" means positioning on or below the object portion, but does not essentially mean positioning on the upper side of the object portion based on a gravity direction.

A rechargeable battery according to an exemplary embodiment will now be described in detail with reference to the accompanying drawings.

Figure 2:
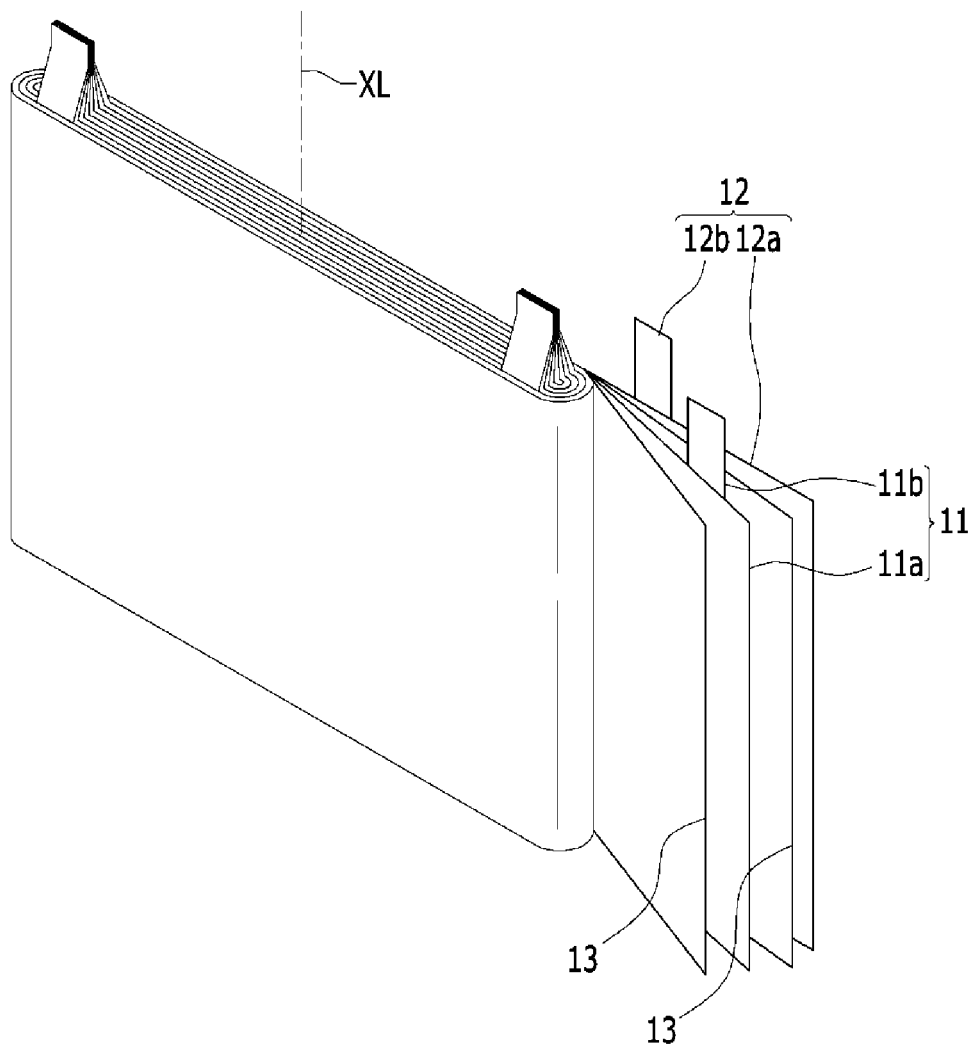
FIG. 2 illustrates a perspective view of the electrode assembly of FIG. 1.

FIG. 1 illustrates a perspective view of a rechargeable battery according to an exemplary embodiment, and FIG. 2 illustrates a perspective view of the electrode assembly of FIG. 1.

Referring to FIGS. 1 and 2, a rechargeable battery 100 according to an exemplary embodiment includes: an electrode assembly 10, a fixing member 400 which surrounds the electrode assembly 10, and a pouch 102 which accommodates the electrode assembly 10 and an electrolyte solution.

The electrode assembly 10, which can be repeatedly charged and discharged assembly, is formed to have a jelly roll form by disposing a first electrode 11 and a second electrode 12 with a separator 13 therebetween, spirally-winding based on a winding axis XL, and then pressing it to be flat.

The first electrode 11 and the second electrode 12 respectively include electrode plates 11a and 12a in which an active material is coated on a thin plate which is formed of a metal foil, and electrode uncoated regions 11b and 12b in which the active material is not coated thereon.

The first electrode plate 11a is formed by coating an active material such as a transition metal oxide on a material that includes a metal foil such as aluminum. The second electrode plate 12a is formed by coating an active material such graphite or carbon on a material that includes a metal foil such as copper or nickel.

The first electrode uncoated region 11b and the second electrode uncoated region 12b may be formed by previously cutting corresponding members in a shape protruded from one side of the electrode plates, in manufacturing the first electrode plate 11a and the second electrode plate 12a are manufactured. Accordingly, the first electrode uncoated region 11b and the second electrode uncoated region 12b each may be the same body with the first electrode plate 11a and the second electrode plate 12a.

The first electrode 11, the separator 13, and the second electrode 12 are spirally wound based on the winding axis XL in the stacked state. The first electrode uncoated region 11b and the second electrode uncoated region 12b are spaced apart from each other so as to not be short-circuited.

One or two of the first electrode uncoated region 11b and the second electrode uncoated region 12b may respectively be formed per each one winding. A plurality of the first electrode uncoated regions 11b may be formed in an overlapped state, and may be welded by ultrasonic welding so that a current may easily flow.

In addition, the second electrode uncoated regions 12b may be formed in an overlapped state, and may be welded by the ultrasonic welding.

The separator 13 is disposed between the first electrode plate 11a and the second electrode plate 12a, and serves to prevent a short-circuit and to allow lithium ions to move. For example, it may be made of polyethylene, polypropylene, or a composite film of polyethylene and polypropylene.

The separator 13 may be disposed not only between the first electrode plate 11a and the second electrode plate 12a but also on the first electrode plate 11a or the second electrode plate 12a. For example, the separator, the first electrode, the separator, and second electrode are sequentially stacked, or the first electrode, the separator, the second electrode, and the separator are sequentially stacked.

The electrode assembly 10 is substantially accommodated in the pouch 102 along with an electrolyte solution. The electrolyte solution may be composed of an organic solvent such as EC, PC, DEC, EMC, and DMC, and a Li salt such as $LiPF_6$ and $LiBF_4$. The electrolyte solution may be in a liquid, solid, and gel state.

The first electrode uncoated region 11b and the second electrode uncoated region 12b of the electrode assembly 10 may be respectively connected to a first electrode lead 21 and a second electrode lead 22 by welding, etc.

The first electrode lead 21 and the second electrode lead 22 are disposed outside a sealing part of one side of the pouch, and are disposed to be spaced apart from each other by a predetermined distance. The first electrode lead 21 and the second electrode lead 22 disposed outside the pouch are disposed to be spaced apart from each other by a predetermined distance, and may be electrically connected to an external device.

In addition, a part in which the first electrode lead 21 and the first electrode uncoated region 11b are electrically connected by welding, etc. and a part in which the second electrode lead 22 and the second electrode uncoated region 12b are electrically connected by welding may be surrounded and sealed with a sealing tape so that the welded parts are not exposed.

On the other hand, the electrode assembly 10 may be fixed in a shape surrounded by a fixing member 400.

The fixing member 400 includes a first fixing member 42 and a second fixing member 44 which are positioned at opposite sides thereof based on the electrode assembly 10. The fixing member 400, which is a lamination film, may include a material that is thermo-bondable, for example, at least one of a polyethylene terephthalate (PET), a poly imide (PI), and an oriented polypropylene (OPP).

Figure 3:
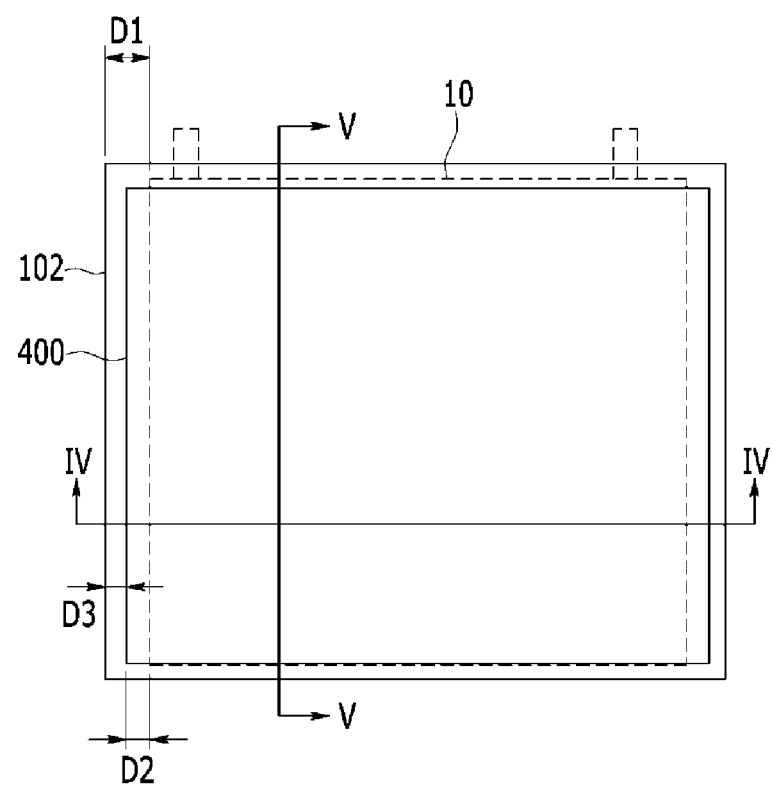
FIG. 3 illustrates a top plan view of an electrode assembly, a fixing member, and a pouch according to an exemplary embodiment.
Figure 4:
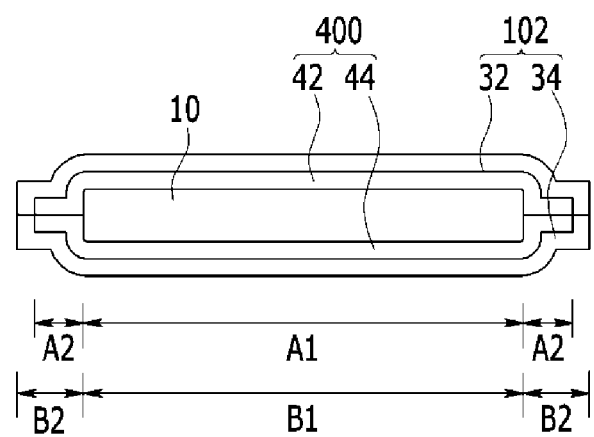
FIG. 4 illustrates a cross-sectional view of FIG. 3 taken along line IV-IV.
Figure 5:
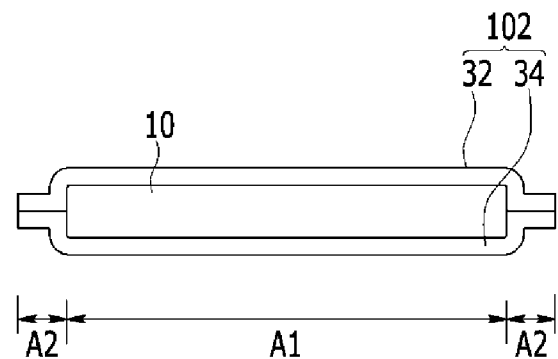
FIG. 5 illustrates a cross-sectional view of FIG. 3 taken along line V-V.
Figure 6:
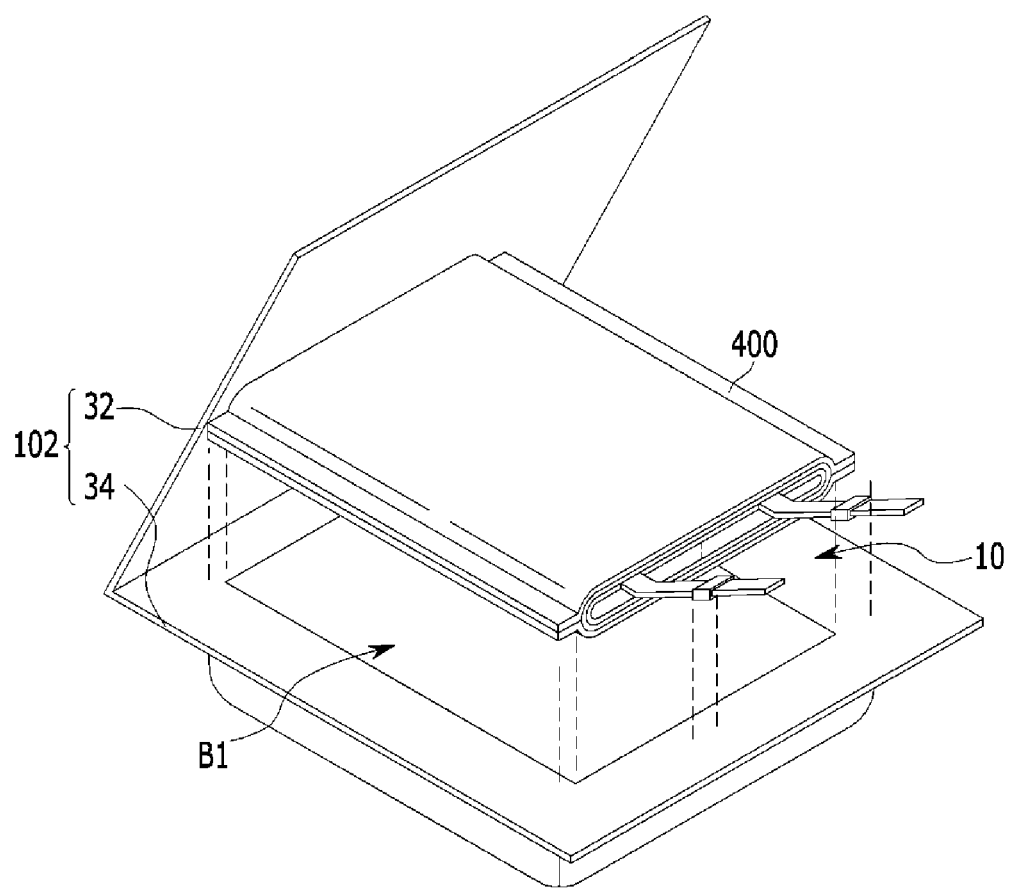
FIGS. 6 and 7 schematically illustrate a perspective view of an alignment of the electrode assembly and the pouch shown in FIG. 3.
Figure 7:
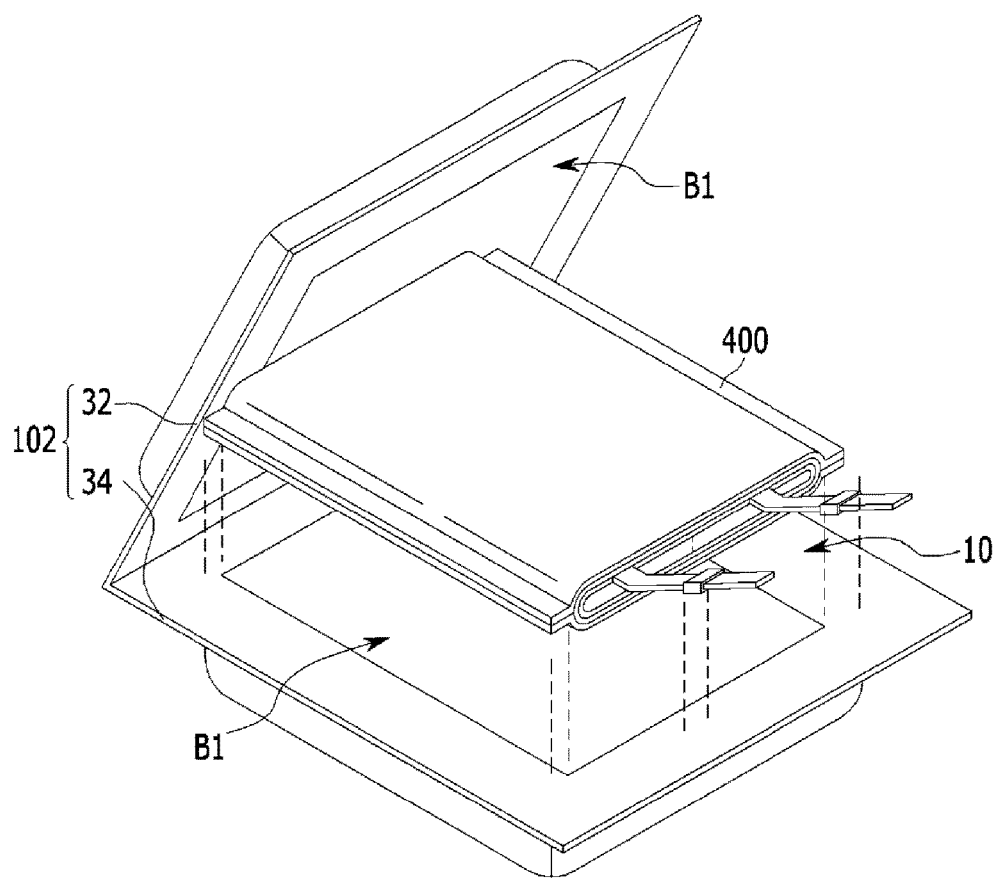

FIG. 3 illustrates a top plan view of the electrode assembly, the fixing member, and the pouch according to the exemplary embodiment, FIG. 4 illustrates a cross-sectional view of FIG. 3 taken along line IV-IV, FIG. 5 illustrates a cross-sectional view of FIG. 3 taken along line V-V, and FIGS. 6 and 7 schematically illustrate a perspective view of an alignment of the electrode assembly and the pouch shown in FIG. 3.

Referring to FIGS. 3 and 5, each of the first fixing member 42 and the second fixing member 44 of the fixing member 400 may have a larger area than one surface of the electrode assembly 10 in order to surround an outer circumferential surface of the electrode assembly 10. Accordingly, the first fixing member 42 and the second fixing member 44 may protrude out of the electrode assembly 10

For example, the first fixing member 42 and the second fixing member 44 each include a first part A1 corresponding to the electrode assembly 10 and a second part A2 that is disposed outside the electrode assembly 10 and is sealed by the first fixing member 42 and the second fixing member 44 being contacted.

The first parts A1 of the first fixing member 42 and the second fixing member 44 are disposed to contact one surface or another surface of the electrode assembly 10, while the second parts A2 of the first fixing member 42 and the second fixing member 44 are thermo-bonded with surfaces contacting with each other to be sealed. When the second parts A2 of the first fixing member 42 and the second fixing member 44 are thermo-bonded, the first fixing member 42 and the second fixing member 44 may contract due to an applied heat. Accordingly, the first fixing member 42 and the second fixing member 44 may be closely attached to the electrode assembly 10. As such, as the fixing member contracts and is closely attached to the electrode assembly 10, it is possible to fix the spirally-wound electrode assembly 10 to prevent the electrode assembly 10 from being deformed.

The second part A2 of the fixing member may be extendedly formed in a parallel direction to the winding axis, but is not limited thereto.

For example, the second part of the fixing member may be extendedly formed in a direction perpendicular to the winding axis, and in this case, it is preferable to form it not so as to obstruct injection of the electrolyte solution injected into the electrode assembly.

The pouch 102 accommodates the electrode assembly 10 surrounded by the fixing member 400 and then is sealed. The pouch 102 includes a pair of exterior members which are disposed at opposite sides of the electrode assembly 10 surrounded by the fixing member 400. The pair of exterior members include an upper exterior member 32 disposed on an upper portion of the electrode assembly 10 and a lower exterior member 34 disposed on a lower portion of the electrode assembly 10.

Each of the lower exterior member and the upper exterior member may be formed to have a multi-layered sheet structure. For example, the pouch includes a polymer sheet that forms an inner side thereof and performs insulating and thermo-bonding function, a PET (polyethylene terephthalate) sheet that forms an outer side and performs a protecting function, a nylon sheet or a PET-nylon composite sheet, and a metal sheet that provides mechanical strength. The metal sheet may be an aluminum sheet and is disposed between the polymer sheet and the nylon sheet.

The lower exterior member 34 includes an accommodation part B1 where the electrode assembly 10 is accommodated, and an edge B2 that is disposed outside the accommodation part B1. The upper exterior member covers the accommodation part B1 of the lower exterior member, and is thermo-bonded to the edge B2 of the lower exterior member to form the sealing part of the pouch 102. As such, the upper exterior member 32 may be thermo-bonded along the edge B2 of the lower exterior member 34 to seal the electrode assembly in the pouch.

The accommodation part B1 may be a concave space which is similar to the electrode assembly 10, such that the electrode assembly 10 surrounded by the fixing member 400 is accommodated therein.

As shown in FIG. 6, the accommodation part B1 is formed in the lower exterior member 34, but is not limited thereto, and may be formed in the upper exterior member 32. In addition, as shown in FIG. 7, the accommodation part B1 may be formed in both the lower exterior member 34 and the upper exterior member 32. When the accommodation part is formed in the lower exterior and the upper exterior member as shown in FIG. 7, a depth of the accommodation part where the electrode assembly is mounted may formed shallower than FIG. 6.

Referring to FIGS. 3 and 6, the second part A2 of the fixing member 400 is disposed to overlap the edge B2 of the exterior member when the electrode assembly 10 is mounted on the accommodation part B1. In this case, a width D1 of the edge B2 that is positioned at an outer side of the accommodation part B1 may be formed to be greater than a width D2 of the second part A2 of the fixing member 400. A distance D3 between the width D1 of the edge B2 and the width D2 of the second part A2 may be equal to or greater than about 1 mm. If the distance D3 therebetween is less than about 1 mm, the edge B2 of the exterior member may be lifted up, not thermo-bonded to each other.

Then, the edge B2 of the exterior member is thermo-bonded in a state in which the second part A2 and the edge B2 of the exterior member are overlapped with each other. As such, when the second part and the edge B2 are overlapped with each other and then are thermo-bonded, the second part A2 of the fixing member 400 is fully covered by the edge B2 of the exterior member to be not exposed out of the pouch.

On the other hand, the pouch type rechargeable battery may be accommodated again in the case, and the edges of the pouch are folded in an accommodation direction to be able to be inserted into the case. In this case, in the exemplary embodiment, as the second part A2 of the fixing member 400 and the edge B2 of the exterior member are folded together in an overlapped state, the exterior member and the fixing member are positioned together at a lateral surface of the electrode assembly, thereby protecting the lateral surface of the electrode assembly more safely.

In order to easily fold the part where the edge and the fixing member are overlapped, notches (not shown) may be formed at predetermined intervals at the folded positions.

When the fixing member is formed as in the exemplary embodiment, the electrode assembly, which has a jelly roll form, may more stably maintain its own form. Further, the rechargeable battery in the pouch may be double-sealed by overlapping the second part of the fixing member and the edge of the pouch and thermo-bonding them.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A pouch type rechargeable battery, comprising:
    an electrode assembly that includes a first electrode, a separator, and a second electrode;
    a fixing member that includes a first fixing member and a second fixing member positioned at opposite sides of the electrode assembly; and
    a pouch that is provided with an accommodation part for accommodating the electrode assembly and a sealing part that surrounds the accommodation part and is thermo-bonded, the sealing part comprising a first sealing part and a second sealing part positioned at opposite sides of the electrode assembly,
    wherein the fixing member has a first part overlapping the electrode assembly, a second part overlapping the sealing part, and a width of the second part is narrower than the sealing part such that the first sealing part directly contacts the second sealing part, and
    wherein the second part of the first fixing member and the second part of the second fixing member are thermo-bonded to each other such that the second part of the first fixing member directly contacts the second part of the second fixing member.

2. The pouch type rechargeable battery of claim 1, wherein
    the first part of the first fixing member and the first part of the second fixing member respectively contact one surface or the other surface of the electrode assembly.

3. The pouch type rechargeable battery of claim 1, wherein
    the fixing member includes at least one of polyethylene terephthalate (PET), poly imide (PI), and oriented polypropylene (OPP).

4. The pouch type rechargeable battery of claim 1, wherein
    the electrode assembly is a jelly roll shape that is spirally-wounded based on a winding axis.

5. The pouch type rechargeable battery of claim 4, wherein
the second part of the fixing member is extendedly formed in a parallel direction to the winding axis.

6. A pouch type rechargeable battery comprising:
an electrode assembly that includes a first electrode, a separator, and a second electrode;
a first fixing member and a second fixing member positioned at opposite sides of the electrode assembly; and
a pouch that is provided with an accommodation part for accommodating the electrode assembly having a sealing part that surrounds the accommodation part and is thermo-bonded, the sealing part comprising a first sealing part and a second sealing part positioned at opposite sides of the electrode assembly;
wherein the first and second fixing members have a first part positioned on the electrode assembly, a second part positioned on the sealing part, and a width of the second part is narrower than the sealing part such that the first sealing part directly contacts the second sealing part; and
wherein the second part of the first fixing member and the second part of the second fixing member are thermo-bonded to each other such that the second part of the first fixing member directly contacts the second part of the second fixing member.

7. The pouch type rechargeable battery of claim 6, wherein
the first part of the first fixing member and the first part of the second fixing member respectively contact one surface or the other surface of the electrode assembly.

8. The pouch type rechargeable battery of claim 6, wherein
the first and second fixing members include at least one of polyethylene terephthalate (PET), poly imide (PI), and oriented polypropylene (OPP).

9. The pouch type rechargeable battery of claim 6, wherein
the electrode assembly is a jelly roll shape that is spirally-wounded based on a winding axis.

10. The pouch type rechargeable battery of claim 9, wherein
the second part of the first and second fixing member is extendedly formed in a parallel direction to the winding axis.

* * * * *